United States Patent
Kobayashi et al.

(10) Patent No.: US 8,824,053 B2
(45) Date of Patent: Sep. 2, 2014

(54) IMAGE FORMING OPTICAL ELEMENT AND IMAGE READING DEVICE

(71) Applicant: Seiko Epson Corporation, Tokyo (JP)

(72) Inventors: Hidekazu Kobayashi, Nagano-ken (JP); Kei Yokota, Nagano-ken (JP); Shoichi Kitagawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 203 days.

(21) Appl. No.: 13/652,801

(22) Filed: Oct. 16, 2012

(65) Prior Publication Data

US 2013/0094091 A1 Apr. 18, 2013

(30) Foreign Application Priority Data

Oct. 18, 2011 (JP) ................. 2011-228708

(51) Int. Cl.
*G02B 27/10* (2006.01)
*G02B 5/00* (2006.01)
*H04N 1/031* (2006.01)
*G02B 3/00* (2006.01)

(52) U.S. Cl.
CPC ............... *G02B 3/005* (2013.01); *G02B 5/005* (2013.01); *H04N 2201/02487* (2013.01); *H04N 1/0312* (2013.01); *H04N 2201/02493* (2013.01)
USPC ............................. 359/619; 359/622; 359/623

(58) Field of Classification Search
USPC ............... 359/619–628; 348/E5.028, E5.026, 348/E5.027, E5.029, 335, 346; 257/291, 257/E29.282, E29.283, E29.28, 435–437
See application file for complete search history.

(56) References Cited

U.S. PATENT DOCUMENTS

2011/0134495 A1* 6/2011 Nagata .......................... 358/474

FOREIGN PATENT DOCUMENTS

JP 2009-246623 10/2009

* cited by examiner

*Primary Examiner* — Thomas K Pham
*Assistant Examiner* — Brandi Thomas

(57) ABSTRACT

Two aperture members are disposed on each side of a lens array. In one aperture member, decreasingly tapered through holes having a cross sectional area that gradually decreases in a light incident direction and increasingly tapered through holes having a cross sectional area that gradually increases in the light incident direction are alternatively arranged. The other aperture member that is oppositely disposed with respect to the lens array has the same configuration. The center axes of the decreasingly tapered through holes and the center axes of the increasingly tapered through holes are coincident with each other. This enables to achieve an image forming optical element that has a large amount of light and less irregularity of the amount of light.

8 Claims, 6 Drawing Sheets

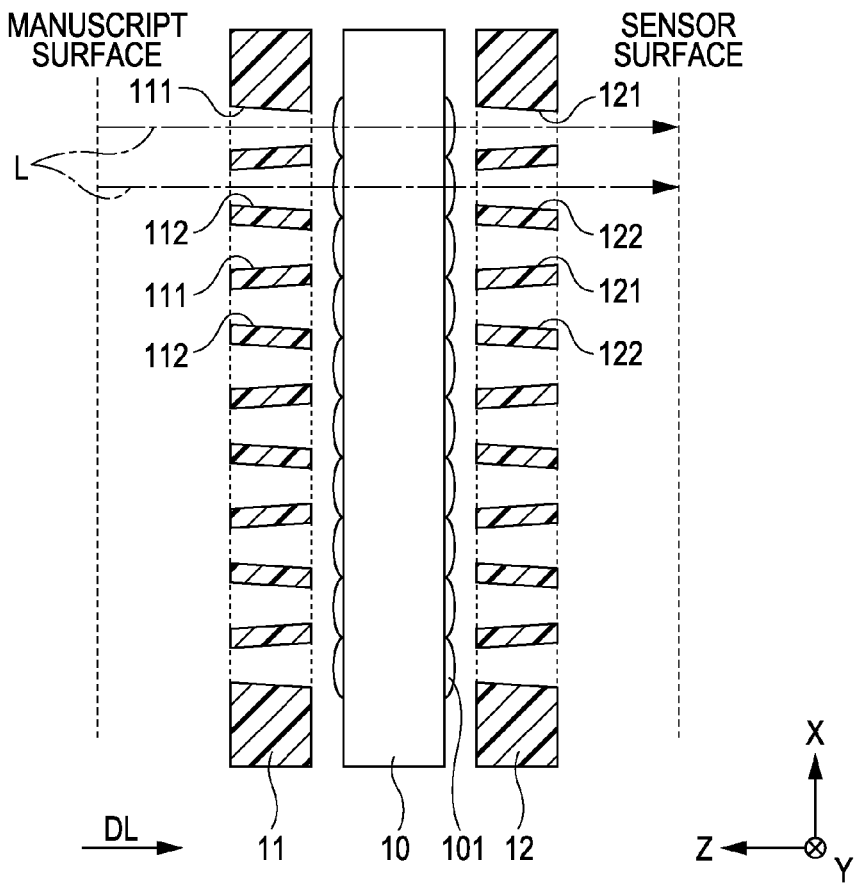
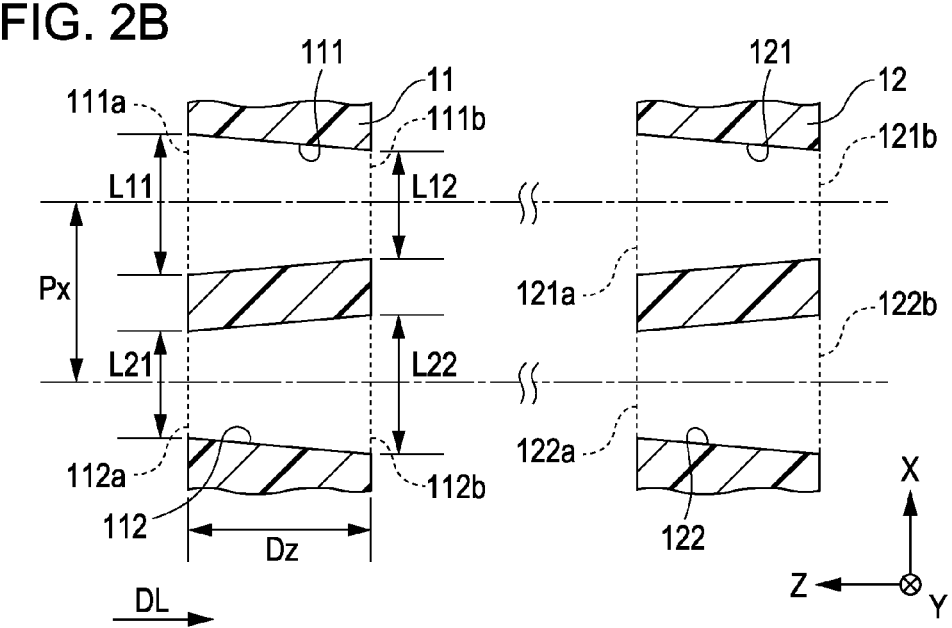

COMPARISON EXAMPLE 1

COMPARISON EXAMPLE 2

| TAPER ANGLE θ [deg] | IDENTICAL ARRANGEMENT | | SYMMETRICAL ARRANGEMENT | |
|---|---|---|---|---|
| | FLUCTUATION RATE [%] | RECEIVED OPTICAL POWER [W] | FLUCTUATION RATE [%] | RECEIVED OPTICAL POWER [W] |
| 0 | 6.50 | 0.6528 | 6.50 | 0.6528 |
| 1 | 6.80 | 0.6188 | 9.60 | 0.5803 |
| 2 | 8.40 | 0.5365 | 9.90 | 0.4924 |
| 4 | 11.50 | 0.3052 | 3.30 | 0.3088 |

IMAGE FORMING OPTICAL ELEMENT AND IMAGE READING DEVICE

The present invention contains subject matter related to Japanese Patent Application No. 2011-228708 filed in the Japanese Patent Office on Oct. 18, 2011, the entire contents of which are incorporated herein by reference.

BACKGROUND

1. Technical Field

The present invention relates to an image forming optical element which can be applied, for example, to scanner devices, and more particularly to an image forming optical element having an image forming optical system and a light shielding member.

2. Related Art

In image scanners, facsimiles, copying machines, financial terminal devices and the like, a contact image sensor modules (hereinafter, referred to as "CISM") is known as an image reading device. In this type of image reading device, SLA (SELFOC (registered trademark) lens array), for example, is generally disposed between a reading object and an optical sensor so that an optical image of the reading object is correctly incident on each of a plurality of fine optical sensors that are arranged in line so as to form an optical image on the optical sensor. JP-A-2009-246623 describes that a lens array and an aperture members (light shielding members) having through holes that correspond to the respective lens configuration are disposed in place of the SLA.

As higher precise image is required, the through holes of the light shielding member becomes finer. Meanwhile, it becomes difficult to manufacture such fine through holes having a uniform cross section. For example, when the light shielding member is manufactured by using a mold, the wall of the through hole must be tapered in order to ensure the separation of the product from the mold. Such a taper may effect on the performance of the light shielding member, and specifically on the quality of resultant image. However, this problem has not been so far adequately addressed.

SUMMARY

An advantage of some aspects of the invention is that an image forming optical element that is capable of obtaining high quality image by using light shielding members that have through holes having a non-uniform cross section.

An aspect of the invention includes an image forming optical system having a lens array formed of a plurality of lenses that are arranged in line with their light axes being parallel to each other so that an incident optical image from one side of the lens array forms an image on the other side of the lens array; a first light shielding member disposed on one side of the image forming optical system and having a plurality of through holes that are arranged in line in the same direction as the lens arrangement direction of the image forming optical system so that light passes through the through holes to be incident on the image forming optical system; and a second light shielding member disposed on the other side of the image forming optical system and having a plurality of through holes that are arranged in line in the same direction as the lens arrangement direction of the image forming optical system so that outgoing light from the other side of the image forming optical system passes through the through holes, wherein the plurality of through holes are decreasingly tapered through holes and increasingly tapered through holes that are alternatively arranged in the same direction as the lens arrangement direction in each of the first light shielding member and the second light shielding member, each decreasingly tapered through hole has a cross sectional area at the upstream opening end which is larger than a cross sectional area at the downstream opening end in a traveling direction of the light that travels from one side to the other side of the image forming optical system, while each increasingly tapered through hole has a cross sectional area at the upstream opening end which is smaller than a cross sectional area at the downstream opening end in the traveling direction of the light, and center axes of the decreasingly tapered through holes in the first light shielding member are coincident with center axes of the decreasingly tapered through holes in the second light shielding member, while center axes of the increasingly tapered through holes in the first light shielding member are coincident with center axes of the increasingly tapered through holes of the second light shielding member.

In the invention having the above configuration, the incident light to the image forming optical element passes through the through holes of the first light shielding member and enters the image forming optical system, and the outgoing light from the image forming optical system passes through the through holes of the second light shielding member and forms an erect equal-magnification image. In both the light shielding members, the decreasingly tapered through holes having a cross sectional area that decreases from the incident side to the outgoing side in the light traveling direction and the increasingly tapered through holes having a cross sectional area that increases in the light traveling direction are alternatively arranged. Further, the respective decreasingly tapered through holes of the first light shielding member and the respective decreasingly tapered through holes of the second light shielding member have the same center axes, while the respective increasingly tapered through holes of the first light shielding member and the respective increasingly tapered through holes of the second light shielding member have the same center axes.

As will be described later in detail, the inventors of the invention had an experiment in which the image forming optical element was configured by using various light shielding members that have through holes having a non-uniform cross section and the performance was assessed. As a result, it revealed that the density irregularity of the light in the resultant optical image is most effectively suppressed when a pair of light shielding members (the first light shielding member and the second light shielding member) have the decreasingly tapered through holes and the increasingly tapered through holes that are alternatively arranged as mentioned above are disposed on each side of the image forming optical system, and the decreasingly tapered through holes and the increasingly tapered through holes in the first light shielding members are positioned coaxially with the decreasingly tapered through holes and the increasingly tapered through holes in the second light shielding members, respectively.

That is, according to the invention, it is possible to achieve the image forming optical element which includes light shielding members that have the through holes having a non-uniform cross section so as to generate high quality images with less density irregularity.

In the above invention, for example, the through holes disposed on each of the first light shielding member and the second light shielding member may have a similar shape at the upstream opening end and the downstream opening end in the light traveling direction. Further, for example, a cross sectional area of the decreasingly tapered through holes disposed on each of the first light shielding member and the second light shielding member in a cross section perpendicular to the light traveling direction may continuously decreases from the upstream end to the downstream end in the light traveling direction, while a cross sectional area of the increasingly tapered through holes disposed on each of the first light shielding member and the second light shielding member in a cross section perpendicular to the light traveling direction may continuously increases from the upstream end to the downstream end in the light traveling direction.

If the cross sectional shape of the through hole at the upstream side (that is, the side of the incident light) and the downstream side (that is, the side of the outgoing light) in the light traveling direction are different, or the cross sectional area of the through hole discontinuously varies, traveling of the light is interrupted, which causes the rate of the amount of outgoing light to the amount of incident light to decrease and the resultant image to be dark. With the above-mentioned configuration, the loss of the amount of light can be reduced.

In the above invention, for example, the decreasingly tapered through holes and the increasingly tapered through holes disposed on each of the first light shielding member and the second light shielding member may have a tapered wall with a taper angle in the range of 0 to 2 degrees. As the taper angle increases, the amount of light passing through the through hole decreases, thereby causing a significant density irregularity. According to the knowledge of the inventors of the invention, the upper limit of the taper angle is practically on the order of 2 degrees, balancing between the amount of light and the quality of image.

Further, for example, a plurality of the decreasingly tapered through holes may all have the same shape and a plurality of the increasingly tapered through holes may all have the same shape in each of the first light shielding member and the second light shielding member. This configuration is advantageous from the perspective of the quality of image, since the irregularity of the amount of light passing though the light shielding member in the arrangement direction of the through holes can be reduced, and is also advantageous in that this facilitates manufacturing of the first and second light shielding members.

Further, the first light shielding member and the second light shielding member may be in the same shape. This makes it possible to use the same shaped member as the first light shielding member and as the second light shielding member depending of its position, thereby reducing the manufacturing cost of the image forming optical element.

Further, for example, when the first light shielding member and the second light shielding member are resin products that are manufactured by injection molding by using molds of the same shape, it is possible to manufacture the light shielding members at a low cost, since the mold is common to both the light shielding members. This is advantageous especially in mass production. Further, in order to ensure separation of the light shielding member from the mold, it is difficult to have a uniform cross section of the through hole. However, in the above configuration, it is possible to achieve the image forming optical element that generates high quality image even with a non-uniform cross section.

BRIEF DESCRIPTION OF THE DRAWINGS

The invention will be described with reference to the accompanying drawings, wherein like numbers reference like elements.

FIGS. 2A and 2B are views which show a cross sectional configuration of aperture members and a positional relationship with respect to a lens array.

DESCRIPTION OF EXEMPLARY EMBODIMENTS

Figure 1:
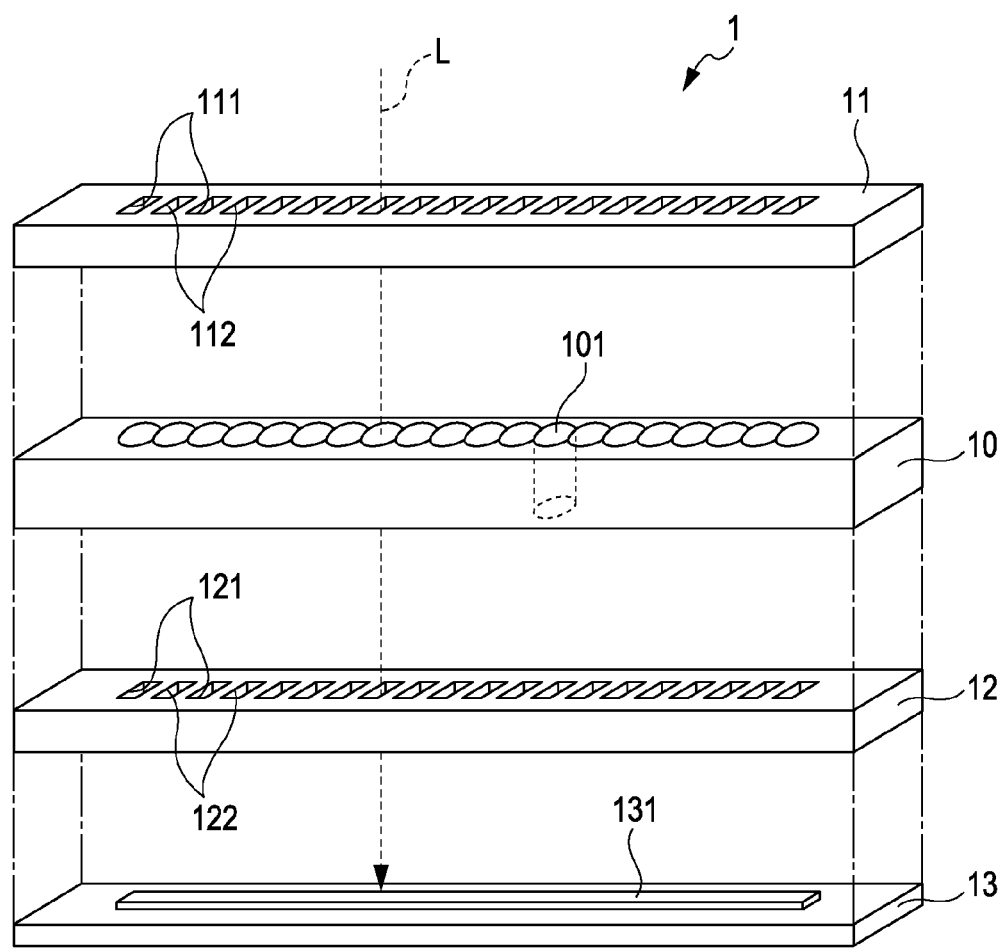
FIG. 1 is a view of a configuration example of a CISM to which the invention is advantageously applicable.

FIG. 1 is a view of a configuration example of a contact image sensor module (CISM) to which the invention is advantageously applicable. More specifically, FIG. 1 is an exploded assembly view of a configuration example of the CISM as an embodiment of an image forming optical element according to the invention. A contact image sensor module 1 has a configuration in which a lens array 10 composed of a plurality of lens units 101 that are arranged in line with their light axes extending in the up-down direction, a pair of aperture members 11, 12 disposed on each side of the lens array 10 and a light receiving unit 13 which is provided with, for example, a CCD line sensor 131 are stacked. The contact image sensor module 1 has functions to receive an outgoing light L from a reading object (for example, a manuscript) placed at a position in the upper area of FIG. 1 at the light receiving unit 13, convert an optical image of the reading object into electrical signals, and output the electrical signals. In the following description, as shown in FIG. 1, a right-handed coordinate system is used in which an arrangement direction of the line sensor 131 of the light receiving unit 13 is defined as X direction, a direction parallel to the light axis of the lens array 10 is defined as Z direction. The outgoing light L from the reading object travels in a negative direction of Z axis (negative Z direction) and is incident on the light receiving unit 13. The CISM also includes a light source (not shown in the figure) that emits light to the reading object.

The outgoing light L from the reading object forms an image on the light receiving unit 13 by the lens array 10, which is an erect equal-magnification image forming optical system. The aperture member 11 having a plurality of through holes 111, 112 that are drilled in the light axis direction and serve to regulate the outgoing direction of the outgoing light passing therethrough is disposed between the reading object and the lens array 10 so as to prevent a stray light from being incident on the light receiving unit 13. Further, the aperture member 12 having a plurality of through holes 121, 122 that are drilled in the light axis direction and serve to regulate the outgoing direction of the outgoing light passing therethrough is disposed between the lens array 10 and the light receiving unit 13.

In the aperture member 11, two types of the through holes 111, 112 having different shapes as will be described below are alternatively arranged in the X direction. Further, in the aperture member 12, two types of the through holes 121, 122 having different shapes are alternatively arranged in the X direction.

FIGS. 2A and 2B are views which show a cross sectional configuration of the aperture members and a positional relationship with respect to the lens array. As shown in FIG. 2A, each through hole 111 in the aperture member 11 formed in a tapered shape having maximum opening dimensions at its upstream end in a traveling direction DL (negative Z direction) of the outgoing light L from the reading object (manuscript surface) and gradually decreasing toward its downstream end. That is, as shown in FIG. 2B, an X direction length L11 of an upstream opening 111a of the through hole 111 in the direction DL and an X direction length L12 of a downstream opening 111b of the through hole 111 in the direction DL have a relation of L11>L12. The same relation applies to the opening dimensions in the Y direction. A thickness of the aperture member 11 (Z direction length) is indicated by reference symbol Dz. Further, a distance between center axes of the adjacent through holes 111 and 112 (which are indicated by the dotted and dashed line and the two-dotted and dashed line in FIG. 2B, respectively), that is, an arrangement pitch of the through holes is indicated by reference symbol Px.

On the other hand, the through holes 112 which are alternatively arranged with the through holes 111 in the X direction, are each formed in a tapered shape having minimum opening dimensions at its upstream end in the traveling direction DL (negative Z direction) of the outgoing light L and gradually increasing toward its downstream end. That is, an X direction length L21 of an upstream opening 112a of the through hole 112 in the direction DL and an X direction length L22 of a downstream opening 112b of the through hole 11 in the direction DL have a relation of L21<L22. The same relation applies to the opening dimensions in the Y direction. Further, although it is not necessarily required, the through holes 111 and 112 may be formed to establish the relationship of L11=L22 and L12=L21.

The openings of the through holes 111, 112 at both ends and cross sections of the through holes 111, 112 in a plane which is perpendicular to the Z axis have a rectangular shape with its longitudinal direction being in the Y direction and the length of each side linearly varying in the Z direction. Accordingly, the cross sectional shapes of each through hole 111 at any two different coordinate values in the Z axis are similar to each other. The same applies to the through hole 112. It is noted that the advantage of the invention is achieved by a taper configuration in the light shielding member in the longitudinal direction (in this example, the X direction), and a taper configuration in the Y direction which is perpendicular to the X direction does not have an significant meaning. Accordingly, the same advantage is achieved without having a taper in the cross section in the Y axis. In this case, the cross sectional shapes of the aperture in the Z direction are not similar to each other.

The dimensions of the through holes 121 in the aperture member 12 are the same as the through holes 111 in the aperture member 11. Further, the dimensions of the through holes 122 in the aperture member 12 are the same as the through holes 112 in the aperture member 11. As shown in FIG. 2B, the aperture member 11 and the aperture member 12 are aligned with each other such that the center axis of the through hole 121 of the aperture member 12 is coincident with the center axis of the through hole 111 of the aperture member 11 (dotted and dashed line), and the center axis of the through hole 122 of the aperture member 12 is coincident with the center axis of the through hole 112 of the aperture member 11 (two-dotted and dashed line).

That is, the shape and arrangement of the aperture member 11 are substantially the same as those of the aperture member 12 such that the aperture member 12, when shifted in Z direction, completely overlaps the aperture member 11. As a result, the light emitted from the manuscript surface enters the opening 111a on one side of the through hole 111 of the aperture member 11, exits the opening 111b on the other side the through hole 111 of the aperture member 11, and enters the lens array 10 on one side (the left side in FIG. 2A). Then, the light exits the lens array 10 on the other side (the right side in FIG. 2A), enters the opening 121a on one side of the through hole 121 of the aperture member 12, and exits the opening 121b on the other side.

Similarly, the light enters the opening 112a on one side of the through hole 112 of the aperture member 11, passes through the opening 112b on the other side of the through hole 112 of the aperture member 11, the lens array 10, the opening 122a on one side of the through hole 122 of the aperture member 12, and exits the opening 122b on the other side of the through hole 122.

The inventors of the invention extensively studied the performance of the image forming optical element which is formed of a combination of the aperture members having the above-mentioned tapered through holes. Specifically, the light was emitted from the test pattern having a uniform density into the CISM in which various different combinations of the shapes of through holes are disposed in front of and behind the lens array in the light traveling direction so as to form an optical image. The density distribution in the optical image was assessed based on a simulation performed by using a light analysis software "LightTools" available from Cybernet Systems Co., Ltd.

The thickness Dz of the aperture members 11, 12 was 0.5 mm. The opening of the through hole in the center plane in the thickness direction of the aperture (a plane recessed from the surface by 0.25 mm) had dimensions of 0.5 mm×0.2 mm, and the opening in the center plane had a taper angle of 2 degrees. The pitch Px of the through holes was 0.35 mm. The lens pitch of the lens array 10 was also 0.35 mm, and each lens 101 had a long axis diameter of 0.8 mm and a short axis diameter of 0.35 mm. The lens array 10 has an X direction length of 225 mm, corresponding to the A4 size, although it is shown as being short in FIG. 2 for the purpose of simplicity. The distance from the manuscript surface on which the test pattern is placed to the aperture member 11 was 2.5 mm, the distance from the aperture member 11 to the incident surface of the lens was 0.52 mm, the distance from the outgoing surface on the lens to the aperture member 12 was 0.84 mm, and the distance from the aperture member 12 to the image-forming surface (the surface of the light receiving unit 13) was 2.14 mm.

Figure 3A:
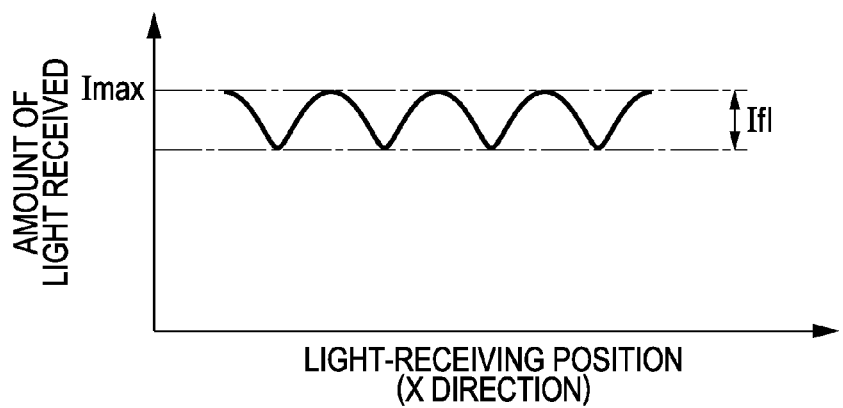
FIGS. 3A to 3C are views which explain details of the simulation.
Figure 3B:
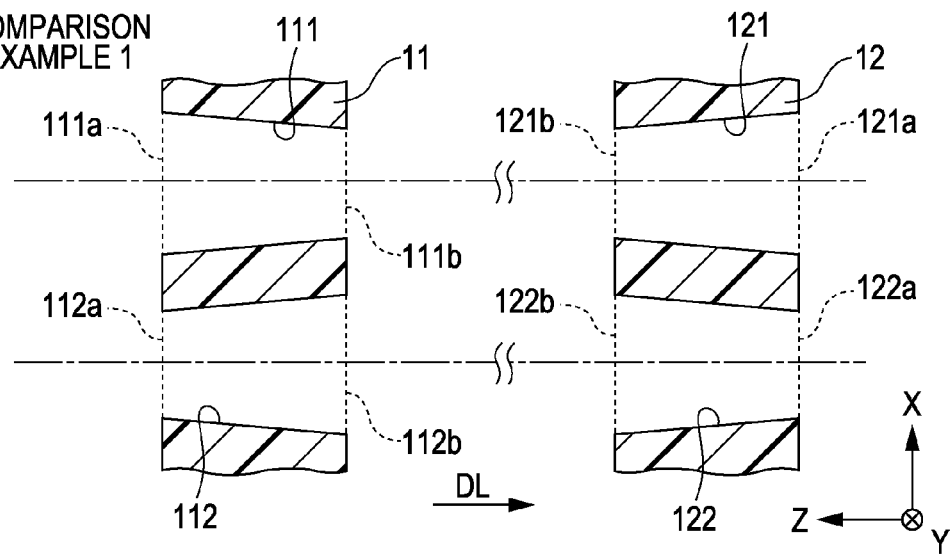
Figure 3C:
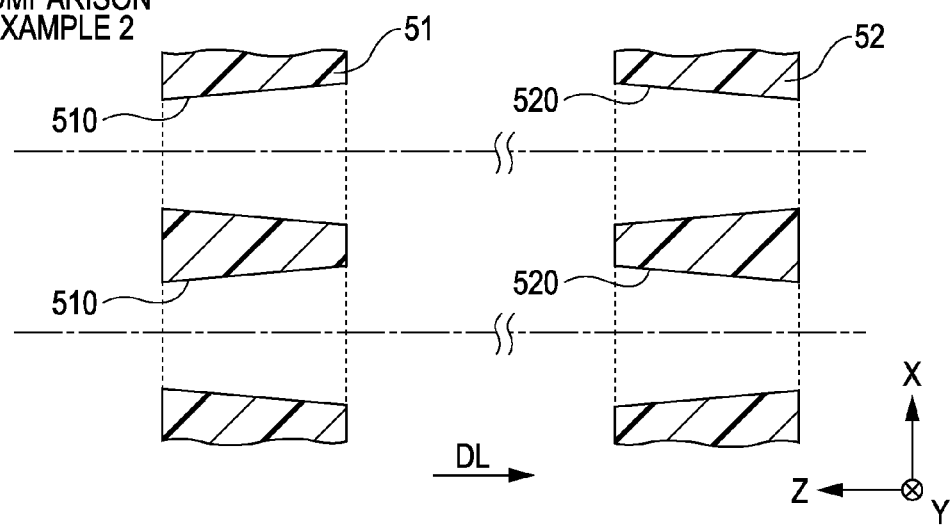

FIGS. 3A to 3C are views which explain details of the simulation. In the CISM having the above-mentioned configuration, the amount of light received fluctuates between the positions close to the lens axis and away from the lens axis. As shown in FIG. 3A, the amount of light received by the light receiving unit 13 fluctuates in a cyclic manner depending on the position. The assessment was conducted based on a rate of a fluctuation amount Ifl to a maximum amount of light received Imax which was regarded as a fluctuation rate of the density that corresponds to the magnitude of density irregularity. According to the assessment, it revealed that the fluctuation rate in the arrangement shown in FIG. 2 was approximately 8.4%.

In a comparison example 1 shown in FIG. 3B, the incident side and the outgoing side of the aperture member 12 were opposite to those shown in FIG. 2 with the openings having smaller dimensions (references 111b, 121b) facing each other and the openings having larger dimensions (references 112b, 122b) facing each other. According to the assessment conducted in the same manner as the above assessment, the fluctuation rate was approximately 9.9%, indicating that a different orientation of the aperture member 12 results in a significant difference of the performance.

Further, in a comparison example 2 shown in FIG. 3C, all the through holes 510 of the aperture member 51 disposed on the side of incident light were increasingly tapered in the light traveling direction DL, while all the through holes 520 of the aperture member 52 disposed on the side of outgoing light were decreasingly tapered in the light traveling direction DL. According to the assessment, the fluctuation rate was approximately 9%, which revealed that, when the image forming optical element was composed of the aperture members having tapered through holes, the appearance of density irregularity significantly varies depending on the combination of the tapered through holes in the taper direction. The present embodiment employs the arrangement shown in FIG. 2 which has the minimum density irregularity.

Figures 4A, 4B:
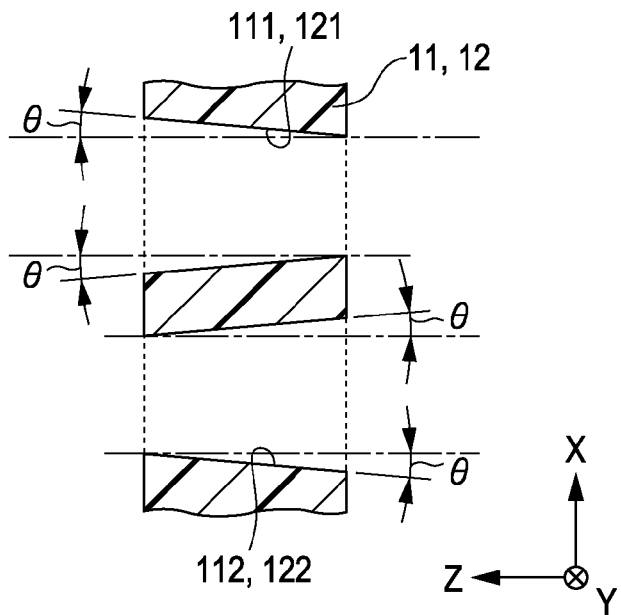
FIGS. 4A and 4B are views which show a relation between the amount of taper angle and the quality of image.

FIGS. 4A and 4B are views which show a relation between the amount of taper angle and the quality of image. As shown in FIG. 4A, angles between each of the inner walls of the through holes 111, 112, 121, 122 and the Z axis in the cross section in the X-Z plane and Y-Z plane were all defined as θ, which was the amount of taper angle. A relation between the amount of taper angle θ and the quality of image was assessed based on a simulation.

In FIG. 4B, the "fluctuation rate" is a rate of the above-mentioned Ifl and Imax. Further, the "received optical power" is the amount of light reaches the light receiving unit 13 converted into an electric power, when the amount of light corresponding to that of a plane light source 25W in a rectangular shape having a plane size of 0.3 mm×2.2 mm is emitted at the emission angle of ±30 degrees. The larger the value is, the smaller the incident light loss is, and the brighter image can be achieved. In addition, the "identical arrangement" indicates the positional relationship between the aperture members 11 and 12 in the present embodiment which is shown in FIG. 2B, while the "symmetric arrangement" indicates the positional relationship between the aperture members 11 and 12 which is shown in FIG. 3B.

As can been seen in FIG. 4B, in the identical arrangement according to the present embodiment, as the taper angle θ becomes larger, the fluctuation rate of the amount of light received increases and the received optical power decreases. This indicate that as the taper angle θ becomes larger, the image becomes darker and the density irregularity increases. On the other hand, in the symmetric arrangement such as that shown in the comparison example 1, results of both the fluctuation rate and the received optical power are generally inferior compared to those in the identical arrangement. Although the decrease of fluctuation rate was observed in the symmetric arrangement when the taper angle θ was 4 degrees, this cannot be regarded as practical because the received optical power is significantly low. Accordingly, in order to obtain a good image balancing between the brightness of the image and the density irregularity, it is preferable to employ the identical arrangement having the taper angle θ of 2 degrees or less.

Next, the technical significance of using the aperture members having the above-mentioned configuration will be described in detail from a manufacturing perspective. The aperture member can be formed, for example, by molding a resin material using a mold which has a plurality of pins (dies) that correspond to the respective through holes. The side face of each die must be tapered in order to ensure separation of the product from the mold. Accordingly, the inner wall of each through hole is inevitably tapered.

In other words, it is practically difficult from a technical or cost perspective to manufacture an aperture member that has through holes having no taper. In particular, since the configuration of aperture member is required to be finer in order to improve the resolution of image, it becomes more important to ensure the separation of product from the mold. As a result, the effect of a taper is unavoidable. Specifically, the light is shielded by a taper of the through hole, which causes problems such as a decrease in the amount of light incident on the optical sensor and an irregularity of the amount of light depending on the position.

Accordingly, a technique of allowing a sufficient amount of light to be incident on the optical sensor with less irregularity by using the aperture members having the tapered through holes will make it possible to manufacture image forming optical elements that generate high quality images at a low cost. In this sense, the configuration according to the present embodiment is beneficial. Further, the aperture members 11, 12 in which the through holes having a cross sectional area that decreases and increases in the light traveling direction DL are alternatively arranged can be manufactured by using the mold as described below.

Figure 5:
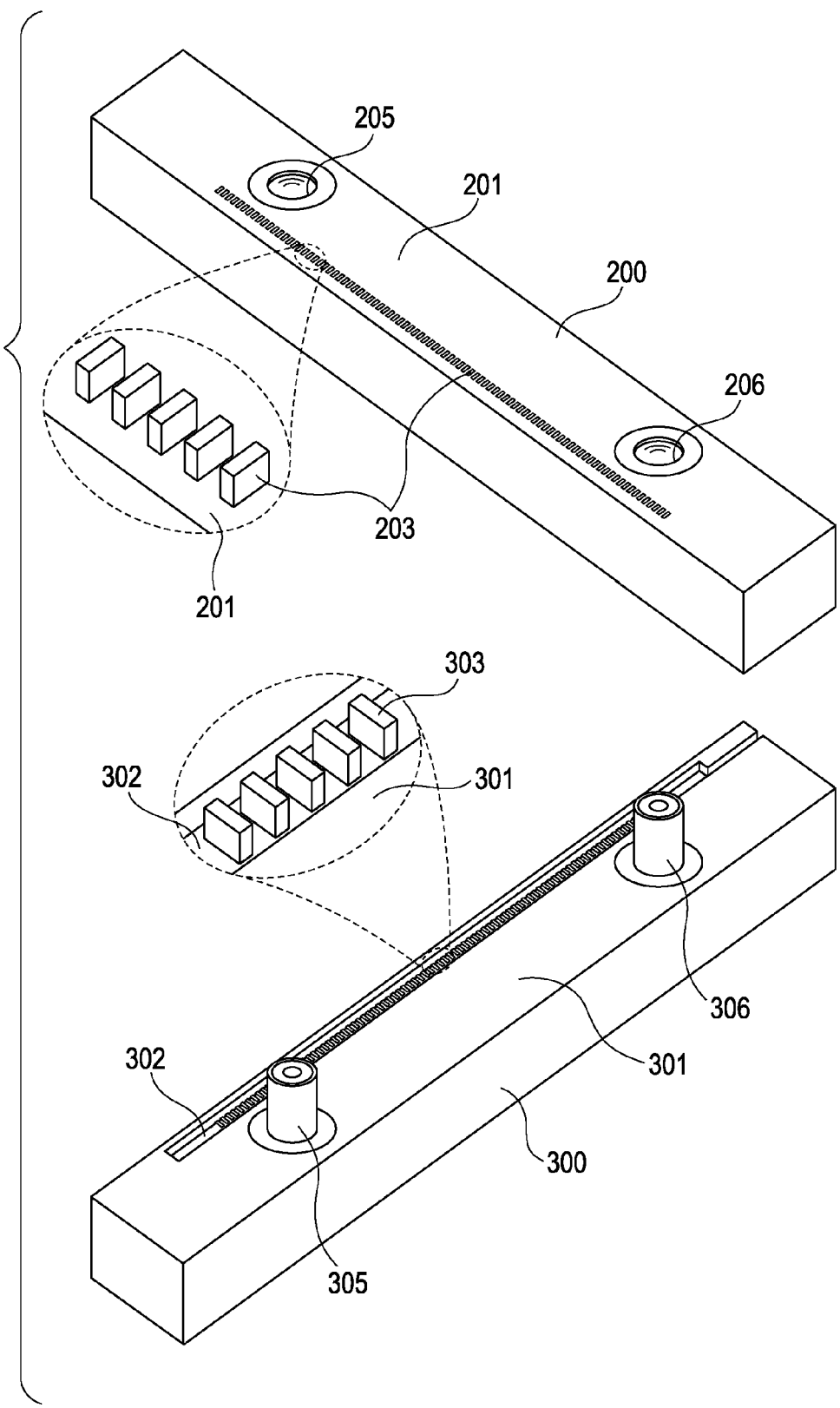
FIG. 5 is a view which shows a configuration example of a mold for manufacturing the aperture member.

FIG. 5 is a view which shows a configuration example of the mold for manufacturing the aperture member. As described above, the aperture members 11, 12 have the same shape, and accordingly, it is possible to manufacture the aperture members 11, 12 by using the same mold. In this sense, the aperture member according to the present embodiment also can be regarded as suitable for industrial production.

The mold for manufacturing the aperture members 11, 12 includes a first mold component 300 and a second mold component 200. As will be described below, the aperture members 11, 12 having a desired shape can be formed by injecting a molten resin material into a gap space formed between the first mold component 300 and the second mold component 200 that are engaged with each other. In FIG. 5, a detailed surface configuration of the mold components 300, 200 is shown by an enlarged partial view circled by the dashed line.

As shown in FIG. 5, in the first mold component 300, a recess 302 is formed on a main surface 301 so as to correspond to the outline of the aperture members 11, 12, and a plurality of projections 303 are arranged in line at equal intervals in a predetermined first direction in the recess 302. The respective projections 303 have a cross sectional shape that corresponds to a cross sectional shape of the respective through holes, such as the through hole 111a, of the aperture members 11, 12. The arrangement pitch of the projections 303 is twice the arrangement pitch Px of the through holes of the aperture members 11, 12, as will be described later. On the other hand, in the second mold component 200, a plurality of projections 203 are arranged in line in a predetermined second direction on a main surface 201 such that the respective projections 203 have a cross sectional shape that corresponds to a cross sectional shape of the respective through holes, such as the through hole 112a, of the aperture members 11, 12. The shape and arrangement pitch of the respective projections 203 are the same or substantially the same as those of the projections 303 of the first mold component 300.

Moreover, in the first mold component 300, two positioning pins 305, 306 having a substantially cylindrical shape project from the main surface 301. Further, in the second mold component 200 that is associated with the first mold component 300, insertion holes 205, 206 that are formed to snugly fit with the positioning pins 305, 306, respectively, are disposed on the main surface 201. The first mold component 300 and the second mold component 200 are engaged with each other by placing them close to each other with the main surface 301 of the first mold component 300 and the main surface 201 of the second mold component 200 facing each other, and inserting the positioning pin 305 into the insertion hole 205 and the positioning pin 306 into the insertion hole 206.

In the state where the first and the second mold components 300, 200 are engaged with each other, the main surface 301 of the first mold component 300 and the main surface 201 of the second mold component 200 face each other. Further, the arrangement direction of the projections 303 of the first mold component 300 (first direction) and the arrangement direction of the projections 203 of the second mold component 200 (second direction) are consistent with each other. In this state, the projections 303 of the first mold component 300 project toward the main surface 201 of the second mold component 200, while the projections 203 of the second mold component 200 project toward the main surface 301 of the first mold component 300.

As a consequence, the projections 303 of the first mold component 300 and the projections 203 of the second mold component 200 are alternatively arranged in line within a space between the main surface 301 of the first mold component 300 and the main surface 201 of the second mold component 200. Accordingly, the aperture member having through holes that correspond to the projections 303, 203 can be formed by injecting a molten resin material into a gap space formed between the two mold components.

Figure 6:
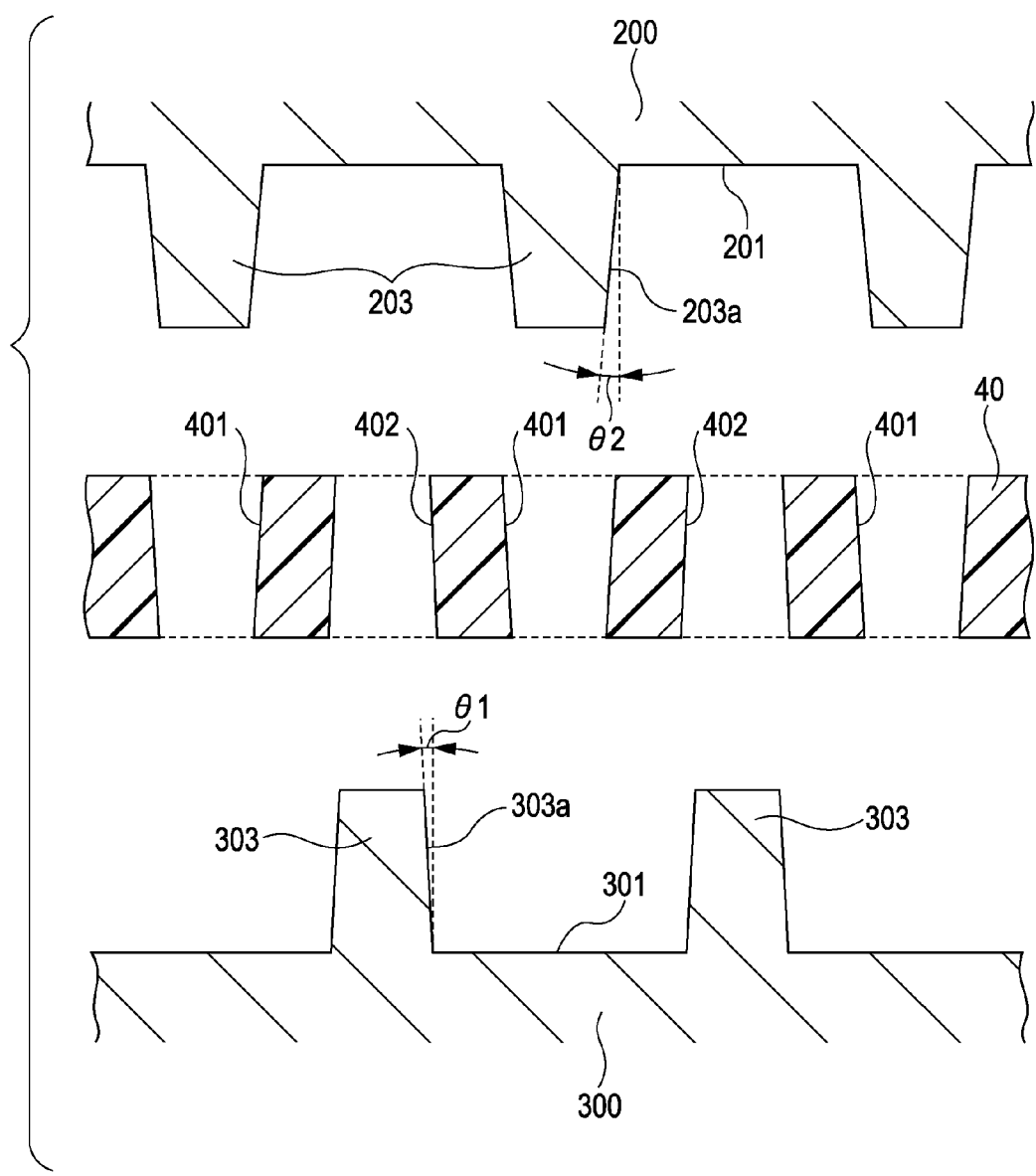
FIG. 6 is an enlarged cross section view which shows a detailed shape of the mold.

FIG. 6 is an enlarged cross section view which shows a detailed shape of the mold. As shown in FIG. 6, a side face 303a of the projection 303 that projects from the main surface 301 of the first mold component 300 has an inclination (taper angle) of angle θ1 (>0) with respect to the normal of the main surface 301. On the other hand, a side face 203a of the projection 203 that projects from the main surface 201 of the second mold component 200 has an inclination of angle θ2 (>0) with respect to the normal of the main surface 201.

As described above, a taper of the projections 303, 203 improves separation of the resin cured after being injected into a space between the engaged mold components, thereby facilitating separation of the finished resin product from the mold. As shown in the middle of FIG. 6, the adjacent through holes 401, 402 in a resultant resin component 40 have different taper directions. That is, the through holes 401 have a shape that downwardly tapers in FIG. 6, while the through hole 402 have a shape that upwardly tapers. Such a shape of the resin component 40 is ideal for the configuration of the aperture members 11, 12 according to the present embodiment.

That is, a shape preferable from a perspective of manufacturing and a shape preferable from a perspective of performance of the aperture member are consistent, and accordingly, it is possible to obtain the aperture members 11, 12 that are easy to manufacture and has a high performance.

In a conventional mold for injection molding, a die has been formed on only one of the mold components that engage with each other mainly from the point of dimensional accuracy. However, manufacturing of a die of 0.1 mm level such as the aperture member of the present embodiment requires a fine cutting tool and inevitably an extended processing time. This results in an increase of manufacturing cost of components.

In the mold shown in FIGS. 5 and 6, the pitch of the dies formed on each of the mold components 300, 200 is twice the arrangement pitch of the through holes. Accordingly, a tool with a larger diameter can be used for fabrication of the die, thereby reducing the manufacturing cost of the mold.

Moreover, in manufacturing of an elongated product having a complicated configuration such as the aperture member 11, for example, if a part of the product remains in one of the mold components and another part of the product remains in the other of the mold components during separation of the product from the molds, the product is twisted, which may cause the product to be deformed or broken during parting of the mold components. Further, in the case where a plurality of products are successively manufactured, if the product does not remain in the same one of the molds, an operation for confirming in which of the molds the product remains becomes necessary during separation of the product from the molds. This causes the process control to be complicated, especially in automating the operations. In order to prevent those problems in advance, the taper angles θ1, θ2 of the dies formed on the mold components 300, 200 are preferably slightly different (to the extent that the performance as the aperture member is not affected). For example, one of the taper angles θ1, θ2 may be 2 degrees and the other may be 1 degree, or alternatively, one of the taper angles θ1, θ2 may be 1 degree and the other may be 1.5 degrees. This makes a difference in ease of separation of the product from each of the mold components, thereby allowing the product to remain in the same one of the mold components during parting of two mold components.

As mentioned above, in a pair of the aperture members 11, 12 having a plurality of through holes arranged in line according to the present embodiment, the through holes 111, 121 having a cross sectional area that gradually decreases in the light traveling direction and the through hole 112, 122 having a cross sectional area that gradually increases in the light traveling direction are alternatively arranged. Further, center axes are common to the through holes 111 and 121 of the aperture members 11, 12, respectively, having a gradually decreasing opening cross sectional area, while center axes are common to the through holes 112 and 122 having a gradually increasing opening cross sectional area.

In the contact image sensor module (CISM) 1 according to the present embodiment in which the above-mentioned pair of the aperture members 11, 12 are disposed on each side of the lens array 10, it is possible to form an optical image with a sufficient amount of light and less density irregularity, thereby enabling to generate high quality images.

Moreover, the aperture members 11, 12 having the above-mentioned configuration also meet the manufacturing requirement to manufacture the aperture members 11, 12 at a low cost in a stable manner.

As mentioned above, the contact image sensor module 1 in the present embodiment corresponds to the "image forming optical element" of the invention. Further, the lens unit 101 functions as the "lens" of the invention, while the lens array 10 functions as the "image forming optical system" of the invention. Further, the aperture members 11 and 12 of the invention function as the "first light shielding member" and the "second light shielding member" of the invention, respectively. In addition, in the above embodiment, the through holes 111, 121 both correspond to a "decreasing tapered through hole" of the invention, while the through holes 112, 122 both correspond to an "increasing tapered through hole" of the invention.

The invention is not limited to the above-mentioned embodiment and, without departing from the spirit of the invention, various modifications other than those described above can be made. For example, although the aperture members 11, 12 in the above embodiment have a configuration in which the through holes for allowing the incident light to pass through, such as the through hole 111, are arranged in line in the X direction, the through holes may be arranged in two or more lines, or alternatively, the two or more lines of the through holes may be positioned slightly offset from each other in the arrangement direction so as to form a so-called zigzag alignment.

Further, although the through hole of the aperture member in the above embodiment has a cross sectional area that continuously varies in the light traveling direction, the cross sectional area may vary, for example, in a stepwise manner.

Still further, although the through hole of the aperture member in the above embodiment has a rectangular cross sectional shape, the cross sectional shape of the through hole is not limited thereto, and various shapes such as circle, oval, rhombus, and a substantially rectangular shape having rounded corners may be applied.

In the above embodiment, although the image forming optical element was described as including one lens array and a pair of aperture member each disposed on each side of the lens array, a plurality of at least one of the lens array and the pair of the aperture members may be provided. Although a single-lens configuration of an erect equal-magnification was illustrated as a lens herein, it is obvious from the nature of the invention that, for example, a double-lens system of an erect equal-magnification may also be applied.

The method of manufacturing the aperture member by using the above-mentioned mold is merely a specific example of the method of manufacturing the "light shielding member" of the invention, therefore the scope of the invention is not intended to be limited to the image forming optical element having the light shielding member that is manufactured by the above-mentioned manufacturing method. That is, any material and any manufacturing method may be used for each of the components in the invention. Further, it is not necessarily required that two light shielding members have the completely identical shape.

The image forming optical element according to the invention can be particularly advantageously applied to image reading devices such as image scanners, facsimiles, copying machines, and financial terminal devices.

What is claimed is:

1. An image forming optical element comprising:
an image forming optical system having a lens array formed of a plurality of lenses that are arranged in line with their light axes being parallel to each other so that an incident optical image from one side of the lens array forms an image on the other side of the lens array;
a first light shielding member disposed on one side of the image forming optical system and having a plurality of through holes that are arranged in line in the same direction as the lens arrangement direction of the image forming optical system so that light passes through the through holes to be incident on the image forming optical system; and
a second light shielding member disposed on the other side of the image forming optical system and having a plurality of through holes that are arranged in line in the same direction as the lens arrangement direction of the image forming optical system so that outgoing light from the other side of the image forming optical system passes through the through holes, wherein
the plurality of through holes are decreasingly tapered through holes and increasingly tapered through holes that are alternatively arranged in the same direction as the lens arrangement direction in each of the first light shielding member and the second light shielding member, each decreasingly tapered through hole has a cross sectional area at the upstream opening end which is larger than a cross sectional area at the downstream opening end in a traveling direction of the light that travels from one side to the other side of the image forming optical system, while each increasingly tapered through hole has a cross sectional area at the upstream opening end which is smaller than a cross sectional area at the downstream opening end in the traveling direction of the light, and
center axes of the decreasingly tapered through holes in the first light shielding member are coincident with center axes of the decreasingly tapered through holes in the second light shielding member, while center axes of the increasingly tapered through holes in the first light shielding member are coincident with center axes of the increasingly tapered through holes of the second light shielding member.

2. The image forming optical element according to claim 1, wherein the through holes disposed on each of the first light shielding member and the second light shielding member have a similar shape at the upstream opening end and the downstream opening end in the light traveling direction.

3. The image forming optical element according to claim 1, wherein a cross sectional area of the decreasingly tapered through holes disposed on each of the first light shielding member and the second light shielding member in a cross section perpendicular to the light traveling direction continuously decreases from the upstream end to the downstream end in the light traveling direction, while a cross sectional area of the increasingly tapered through holes disposed on each of the first light shielding member and the second light shielding member in a cross section perpendicular to the light traveling direction continuously increases from the upstream end to the downstream end in the light traveling direction.

4. The image forming optical element according to claim 3, wherein the decreasingly tapered through holes and the increasingly tapered through holes disposed on each of the first light shielding member and the second light shielding member have a tapered wall with a taper angle in the range of 0 to 2 degrees.

5. The image forming optical element according to claim 1, wherein the plurality of the decreasingly tapered through holes all have the same shape and the plurality of the increasingly tapered through holes all have the same shape in each of the first light shielding member and the second light shielding member.

6. The image forming optical element according to claim 1, wherein the first light shielding member and the second light shielding member are in the same shape.

7. The image forming optical element according to claim 6, wherein the first light shielding member and the second light shielding member are resin products that are manufactured by injection molding by using molds of the same shape.

8. The image reading device comprising:
a light source that emits light to an object;
the image forming optical element according to claim 1; and
a reading unit that reads an erect equal-magnification image formed by the image forming optical element.

* * * * *